June 13, 1950
E. C. PATRICK
2,511,293
APPARATUS FOR EXFOLIATING GRANULAR SILICEOUS MATERIAL
Filed Dec. 12, 1945
2 Sheets-Sheet 1
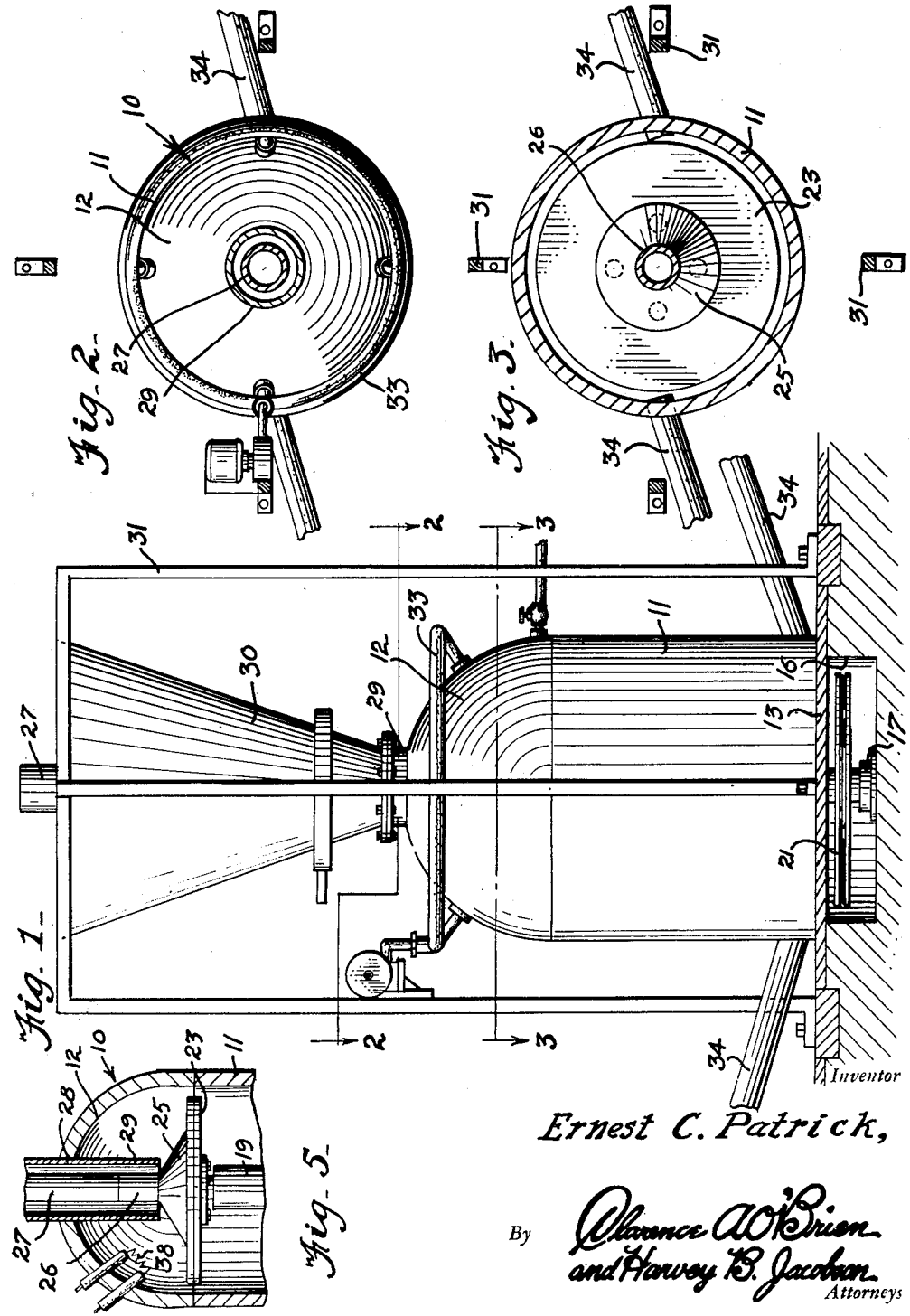
Inventor
Ernest C. Patrick,
By Clarence A. O'Brien
and Harvey B. Jacobson
Attorneys

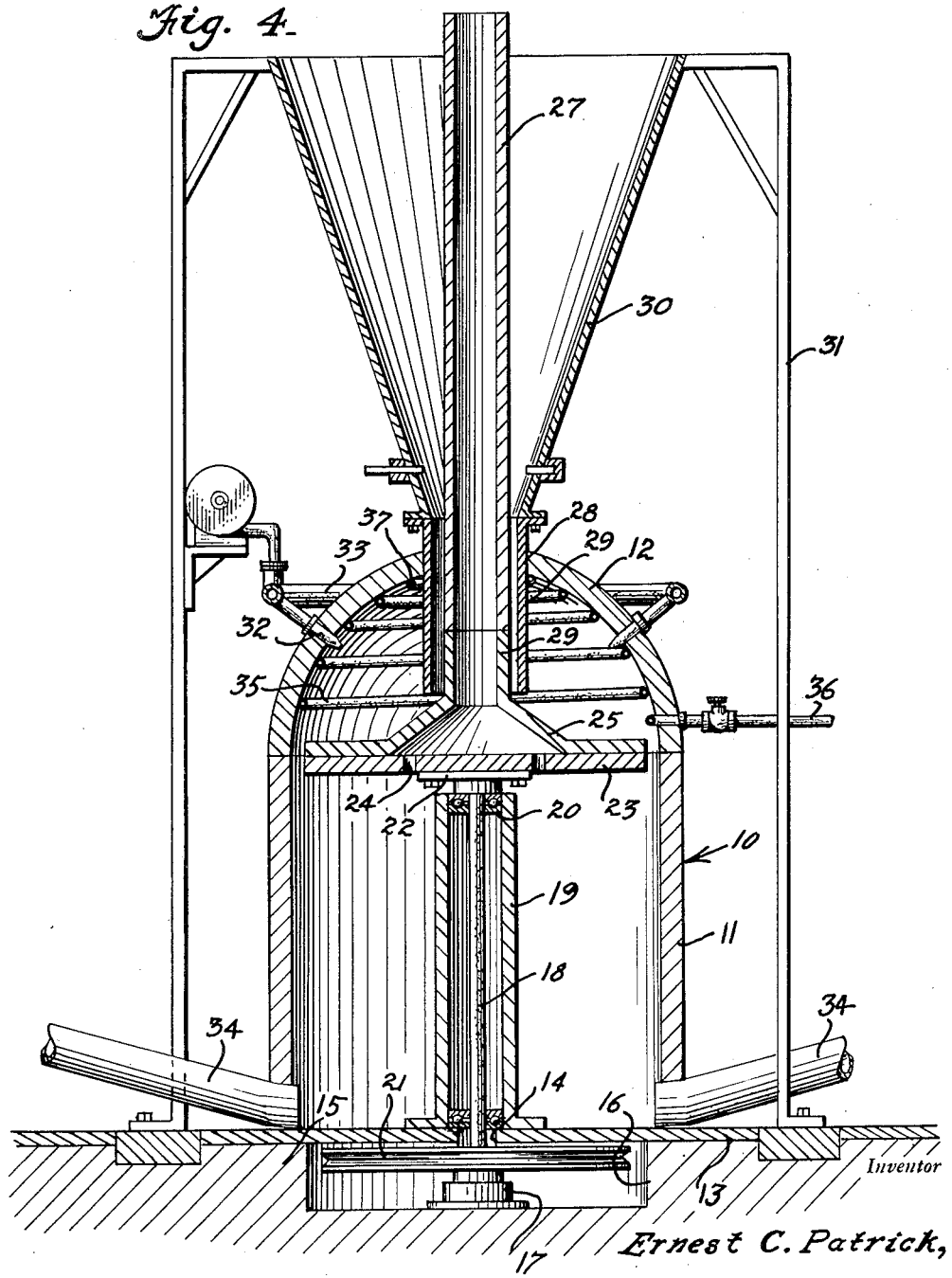

Patented June 13, 1950

2,511,293

UNITED STATES PATENT OFFICE 2,511,293

APPARATUS FOR EXFOLIATING GRANULAR SILICEOUS MATERIAL

Ernest C. Patrick, Phoenix, Ariz., assignor of fifty per cent to Thomas W. Webb, Phoenix, Ariz.

Application December 12, 1945, Serial No. 634,608

4 Claims. (Cl. 263—21)

In certain parts of the country a glassy siliceous volcanic rock characterized by a laminated shelly texture in which the laminations are more or less concentric may be found. It has been discovered that this material when crushed to proper size and exposed to a temperature of between 1200° F. to 2000° F. will expand to about 6¼ times it original volume. Such an expanded or exfoliated product finds many uses in industry, particularly the building trade where it may be used as bulk insulation in buildings, acoustical products such as plaster and tile, and as a light weight ingredient when introduced into the aggregate from which concrete building blocks or the like are formed. Such material serves admirably in acoustical wallboard as well as for thermal insulation in industrial applications.

The primary object of the present invention is to facilitate the production of such exfoliated material.

Another object is to effect economies in the production of such material through the medium of continuous operation.

The above and other objects may be attained by employing this invention which embodies among it features reducing the siliceous material to granular form, spreading the granular siliceous material in a thin layer, introducing the said layer into a heated zone and agitating the grains of material in the heated zone uniformly to expose all sides of each grain to the highest temperature of said zone.

Other features include a moving inclined surface in a heated zone and means for depositing raw granular siliceous material adjacent the highest point of said moving inclined surface whereby the grain so deposited will be so agitated as uniformly to expose all sides of each grain to the highest temperature in the zone.

Still other features include means to introduce a gaseous substance into said zone to inhibit fusion of the surfaces of the grains.

In the drawings:

Figure 1 is a side view of one example of a furnace suitable for carrying out the purposes of this invention, Figure 2 is a horizontal sectional view taken substantially on the line 2—2 of Figure 1, Figure 3 is a horizontal sectional view taken substantially on the line 3—3 of Figure 1, Figure 4 is a vertical sectional view through the furnace illustrated in Figure 1, Figure 5 is a fragmentary sectional view similar to Figure 4 showing a modified form of heating means for the furnace.

Referring to the drawings in detail my improved furnace designated generally 10 comprises a refractory cylinder 11 supporting at its upper end a refractory dome 12.

The lower end of cylinder 11 rests on a suitable base 13 which is formed with an opening 14 concentric with the longitudinal axis of the cylinder and the base 13 is mounted on a suitable foundation 15 which is formed directly below the cylinder 11 with a concentric cavity 16 for a purpose to be more fully hereinafter described.

Seated on the bottom wall of the cavity 16 is a suitable thrust bearing 17 forming the bottom support for a shaft 18 which rises upwardly through a vertical column 19, the lower end of which rests upon the base 13 in concentric relation with the opening 14 while the upper end is fitted with a suitable anti-friction bearing 20 in which the shaft 18 runs. As illustrated in Figure 4 the shaft 18 projects through the concentric opening 14 and keyed or otherwise secured to the shaft adjacent its lower end is a drive wheel 21 by which the shaft is rotated. The drive wheel 21 is housed within the chamber 16 and by way of example in the present illustration takes the form of a pulley about which a suitable drive belt may be trained to be driven from any desirable source of power. It is to be understood however that the drive wheel 21 may take the form of a gear or any other suitable driving element.

Secured to the upper end of the shaft 18 and riding on the upper race of the anti-friction bearing 20 is a flange 22 upon which a rotating table 23 of any suitable refractory material is supported. This table is provided with an annular row of openings 24 arranged concentrically with relation to its axis and mounted on the upper side of the table 23 is a distributing cone 25 down the outer surface of which the granular material rolls as will be more fully hereinafter described.

The upper end of the cone 25 opens into a tubular extension 26 which aligns with the lower end of a suitable stack 27 through which the products of combustion from the furnace escape.

Formed in the dome 12 concentric with the cylinder 11 is an axial opening 28 for the reception of a thimble 29 the lower end of which terminates slightly above the junction of the cone 25 with the sleeve 26 and as illustrated in Figure 4 this thimble is in spaced concentric relation with the exterior of the lower portion of the stack 27 and the tubular extension 26. Bolted or otherwise secured to the upper end of the thimble 29 is a hopper 30, the upper end of which is supported on any suitable structure such as a framework 31.

Arranged at spaced intervals in the dome 12 are burner nozzles or tuyères 32 which are connected to any suitable source of fuel supply through the medium of a pipe 33. These burner nozzles are directed so that the flames therefrom converge toward the axis of the table 23 so that the cone 25 will be exposed to the direct flame from each burner. As shown in Figure 4 the table 23 is of somewhat less diameter than the interior diameter of the cylinder 11 and is located at the junction of the cylinder and dome and when the device is in operation it will be evident that granular material fed into the hopper 30 will descend downwardly through the convergent end of the hopper into the thimble 29 in the form of a thin annular layer encircling the lower end of the stack 27 and the tubular extension 26 of the cone 25. Emerging from the lower end of the thimble 29 the thin layer of granular material will be deposited at the highest portion of the cone 25 so that under the influence of gravity it will tend to roll down the surface of the cone onto the table 23 and under the direct influence of the flames from the burners or tuyères 32. Rotation of the table will cause the granular substance deposited on the flat top surface thereof from the cone 25 to move under the influence of centrifugal force toward the periphery of the table so as to be deposited on the base 23 within the tubular body 11. In passing through the heated zone thus created the granular material will be exfoliated or expanded to approximately 6½ times its original size and will fall by gravity to the bottom of the cylinder 11. In order to remove the product thus prepared from the interior of the cylinder I provide at spaced intervals adjacent the bottom end thereof a plurality of exhaust pipes 34 which may be connected to any suitable source of reduced pressure (not shown) which will serve to extract the prepared material from the lower end of the cylinder 11 and deposit it in any suitable container such as a bin.

In certain instances I find it advantageous to introduce into the heated zone within the dome 12 a suitable vapor which will inhibit fusion of the surfaces of the grains and to this end I arrange within the dome a series of heating coils 35 into which water may be introduced through a suitable valved supply pipe 36 to be vaporized and discharged through openings in the upper most coil 37 into the interior of the dome 12 in the form of steam.

In operation the siliceous volcanic rock is first crushed to produce grain of about the size of an ordinary pea. The granular material thus produced is introduced into the hopper and descending therethrough enters the space between the thimble 29 and the cylindrical extension of the cone 25. Flowing between the thimble and the extension the grains are so distributed as to produce substantially a single layer of granular material which emerges from the lower end of the space between the thimble 29 and the extension 26 to be deposited on the highest portion of the cone 25. With the wheel 21 in motion the shaft 18 rotates the table 23 and the cone 25 in unison so that the granular material rolls down the inclined face of the cone. Due to the rotary motion imparted to the cone the granular material is brought directly beneath the flames from the burners or tuyères 32. These tuyères produce a temperature within the dome of from 1200° F. to 2000° F. and the intense heat expands the grains so that by the time they leave the edge of the table 23 under the influence of centrifugal force created by the rotation of the table they will have attained a volume approximately 6½ times their original diameter. In order to preserve the surface of the grains against glazing I find it advantageous to introduce water into the pipe 36 which passing into the coils 35 is rapidly converted to steam which emerges through the upper most coil 37 into the chamber beneath the dome and above the table. The products of combustion from the heated dome flow downwardly around the edge of the table 23 and then upwardly through the openings 24 into the interior of the cone 25 and then through the cylindrical extension 26 into the stack 27 where they are exhausted to atmosphere. Obviously the heated products of combustion passing through the openings 24 and into the cone 25 serve to elevate the temperature thereof and hence contribute to the efficiency of the device. The expanded material leaving the edge of the table 23 drops to the base 13 within the cylinder 11 and is collected by the exhaust pipes 34 for deposit into any suitable receptacle ready for distribution and use.

In the modification illustrated in Figure 5 I have shown in place of the burners or tuyères 32 an electrical heating unit 38 which may be substituted where the use of electrical power for heating purposes is sufficiently economical. Obviously many other types of heating devices may be employed according to the power or fuel available and the desires of the user.

While in the foregoing there has been shown and described the preferred embodiment of this invention it is to be understood that minor changes in the details of construction, combination and arrangement of parts may be resorted to without departing from the spirit and scope of the invention, as claimed.

I claim:

1. Apparatus for producing exfoliated granular siliceous material which includes a heating chamber, a table mounted to rotate within the lower end of said heating chamber, a conical surface extending upwardly from said table within the heating chamber, means to feed an annular layer of granular siliceous material axially through the heating chamber onto the conical surface near its upper end, means to rotate the table, fuel burning means within said dome and passages in the table to direct the products of combustion resulting from the burning of fuel within said heating chamber into contact with the side of the conical surface remote from that upon which the granular material is deposited.

2. Apparatus for producing exfoliated granular siliceous material which includes a dome shaped heating chamber, a table mounted to rotate within the lower end of said heating chamber, a conical surface extending upwardly from said table within the heating chamber, a thimble extending axially through the dome and terminating near the upper end of the conical surface through which granular siliceous material is fed to the conical surface, means to rotate the table, heating means in the dome, and a stack extending axially through the thimble.

3. Apparatus for producing exfoliated granular siliceous material which includes a dome shaped heating chamber, a table mounted to rotate within the lower end of said heating chamber, a conical surface extending upwardly from said table within the heating chamber, a thimble extending axially through the dome and terminating near the upper end of the conical surface through which granular siliceous material is fed to the conical surface, means to rotate the table, heating means in the dome, a hopper at the upper end of the thimble for feeding granular material thereto and a stack extending upwardly from the upper end of the conical surface axially through the thimble and hopper.

4. Apparatus for producing exfoliated granular siliceous material which includes a heating chamber, a table mounted to rotate within the lower end of said heating chamber, a conical surface extending upwardly from said table within the heating chamber, means to feed an annular layer of granular siliceous material axially through the heating chamber onto the conical surface near its upper end, an annular row of burners in the heating chamber arranged to direct flames issuing therefrom against the upper side of the conical surface in a direction substantially normal thereto and passages in the table to direct the products of combustion resulting from the burning of fuel within said heating chamber into contact with the side of the conical surface remote from that upon which the granular material is deposited.

ERNEST C. PATRICK.

REFERENCES CITED

The following references are of record in the file of this patent:

UNITED STATES PATENTS

| Number | Name | Date |
| --- | --- | --- |
| 130,044 | Harding | July 30, 1872 |
| 876,567 | Lee | Jan. 14, 1908 |
| 1,003,628 | Mathesius | Sept. 19, 1911 |
| 1,827,467 | Giles | Oct. 13, 1931 |
| 1,963,275 | Labus | June 19, 1934 |
| 2,021,956 | Gladney | Nov. 26, 1935 |
| 2,029,524 | Denning | Feb. 4, 1936 |
| 2,139,378 | Myers et al. | Dec. 6, 1933 |

FOREIGN PATENTS

| Number | Country | Date |
| --- | --- | --- |
| 446,045 | Great Britain | Apr. 23, 1936 |

OTHER REFERENCES

Compressed Air Magazine, vol. 47, 1942, page 6694.